(12) United States Patent
Stark et al.

(10) Patent No.: US 10,450,969 B2
(45) Date of Patent: Oct. 22, 2019

(54) ELECTRIC EXHAUST GAS VALVE DEVICE

(71) Applicant: Eberspächer Exhaust Technology GmbH & Co. KG, Neunkirchen (DE)

(72) Inventors: Annika Stark, Wernau (DE); Steffen Schmitt, Ostfildern (DE); Markus Birgler, Wernau (DE); Stefanos Varelis, Leinfelden (DE); Matthias Grün, Altbach (DE); Milijenko Novosel, Stuttgart (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 392 days.

(21) Appl. No.: 15/282,420

(22) Filed: Sep. 30, 2016

(65) Prior Publication Data
US 2017/0138274 A1 May 18, 2017

(30) Foreign Application Priority Data

Nov. 17, 2015 (DE) .................. 10 2015 222 609

(51) Int. Cl.
| | |
|---|---|
| *F02D 9/04* | (2006.01) |
| *F16K 31/04* | (2006.01) |
| *F02D 9/06* | (2006.01) |
| *F02D 9/10* | (2006.01) |
| *F16K 1/22* | (2006.01) |
| *F02M 26/54* | (2016.01) |
| *F02M 26/70* | (2016.01) |

(52) U.S. Cl.
CPC .............. *F02D 9/04* (2013.01); *F02D 9/06* (2013.01); *F02D 9/1065* (2013.01); *F02M 26/54* (2016.02); *F02M 26/70* (2016.02); *F16K 1/22* (2013.01); *F16K 31/043* (2013.01); *F16K 31/047* (2013.01)

(58) Field of Classification Search
CPC .................. F02D 9/04; F02D 9/06; F02D 9/1065; F02M 26/54; F02M 26/70; F16K 1/22; F16K 31/043; F16K 31/047
USPC .......................................................... 60/324
See application file for complete search history.

(56) References Cited

U.S. PATENT DOCUMENTS

| | | | | |
|---|---|---|---|---|
| 7,957,890 | B2 * | 6/2011 | Enomoto | F02D 41/0055 701/112 |
| 9,523,332 | B2 * | 12/2016 | Kobayashi | F02M 26/50 |
| 2005/0183705 | A1 * | 8/2005 | Nanba | F02D 9/1045 123/568.24 |

(Continued)

*Primary Examiner* — Phutthiwat Wongwian
*Assistant Examiner* — Diem T Tran
(74) *Attorney, Agent, or Firm* — McGlew and Tuttle, P.C.

(57) ABSTRACT

An electric exhaust gas valve device (1) controls a flow cross section (5) of an exhaust pipe (6) of an exhaust system (8) of an internal combustion engine. The valve device includes an electric drive (2) driving a driven shaft (9) rotatingly about an axis of rotation (10). An exhaust gas valve (3) has a drive shaft (12) aligned coaxially to and rotatable about the axis of rotation for controlling the cross section. A coupling device (4) transmits torques between the driven shaft and the drive shaft and includes a connection element connected to the drive shaft, a transmission element (16) connected to the driven shaft and the connection element with a prestressing spring (18) supported axially on the connection element and/or on the drive shaft as well as on the transmission element and axially driving the transmission element against the driven shaft to reduce thermal load.

20 Claims, 4 Drawing Sheets (56) References Cited

U.S. PATENT DOCUMENTS

2008/0115494 A1\* 5/2008 Willats .................... F01N 13/08
60/686

\* cited by examiner

ELECTRIC EXHAUST GAS VALVE DEVICE

CROSS REFERENCE TO RELATED APPLICATIONS

This application claims the benefit of priority under 35 U.S.C. § 119 of German Application 10 2015 222 609.3 filed Nov. 17, 2015, the entire contents of which are incorporated herein by reference.

FIELD OF THE INVENTION

The present invention pertains to an electric exhaust gas valve device for controlling a cross section, through which flow is possible, of an exhaust pipe of an exhaust system of an internal combustion engine. The present invention pertains, in addition, to a muffler equipped with such an electric exhaust gas valve device and to an exhaust system equipped with such an exhaust gas valve device.

BACKGROUND OF THE INVENTION

Exhaust gas valve devices may be considered for various functions in exhaust systems. For example, the counterpressure in an exhaust pipe can be specifically temporarily increased by means of an exhaust gas valve device. This can be carried out, e.g., for improving or making possible an exhaust gas recovery. Exhaust gas valve devices are often used to open an additional exhaust gas path, which is blocked in case of small quantities of exhaust gas, within the exhaust system for operating states of an internal combustion engine, in which large quantities of exhaust gas accumulate. Here, the terms "large" and "small" are defined in relation to one another. Consequently, for example, an exhaust system can be adapted to different operating states of the internal combustion engine in terms of the counterpressure and damping action. An exhaust gas path can be blocked by means of the exhaust gas valve device in the case of a partial load, for example, in order to achieve an especially efficient muffling. By contrast, said exhaust gas path is opened in the case of a full load in order to reduce the counterpressure of the exhaust system, which increases the performance of the internal combustion engine for drive purposes. In particular, such exhaust gas valve devices can be embodied on or in mufflers to be able to control at least one of two or more exhaust gas paths there. The controllability of the respective cross section, through which flow is possible, of the respective exhaust pipe includes at least one open position, in which the cross section, through which flow is possible, of the exhaust pipe is minimally reduced, and a closed position, in which the cross section, through which flow is possible, of the exhaust pipe is maximally reduced. Depending on the configuration of the exhaust gas valve device and depending on the application, one or more or any desired intermediate positions may also be adjustable. In the closed position, the cross section to be controlled can be closed fully or up to a desired valve bypass. This valve bypass may be desired, e.g., for an emergency running property of the exhaust system in case the exhaust gas valve device fails in the closed position.

While an exhaust gas valve device may, in principle, have any desired drive, the electric exhaust gas valve device relevant here is equipped with an electric drive, which is, for example, an electric motor with or without gear transmission. The electric drive has a driven shaft which can be driven rotating about an axis of rotation. The exhaust gas valve device is, furthermore, equipped with an exhaust valve, which has a valve diaphragm and a drive shaft aligned coaxially to the axis of rotation and which can be rotated about the axis of rotation for controlling the cross section to be controlled. The driven shaft and the drive shaft are now advantageously coupled to one another in a suitable manner for transmitting torques, for which a coupling device suitable for this purpose can, in principle, be used.

The thermal load of the electric drive is often problematic in such electric exhaust gas valve devices. During the operation of the exhaust system, the exhaust gas valve, which is exposed directly to the hot exhaust gas stream, can heat up. At the same time, heat is also introduced into the drive shaft here. The heat also reaches the driven shaft via the coupling device and reaches the thermally sensitive electric drive via this driven shaft as well. The heat-related expansion of the drive shaft via the respective coupling device may also lead to a high axial mechanical load of the electric drive.

SUMMARY OF THE INVENTION

An object of the present invention is to provide an improved configuration, which is characterized, in particular, by a reduced thermal load of the electric drive, for an electric exhaust gas valve device of the type described above and for an exhaust system equipped therewith and for a muffler equipped therewith. Further, a reliable manner of functioning of the exhaust gas valve device is intended, and in particular, reliable positioning of the exhaust gas valve in the respectively adjusted control position is also desired. In addition, a low-cost manufacturability is intended.

According to the invention, an electric exhaust gas valve device for controlling a cross section, through which flow is possible, of an exhaust pipe of an exhaust system of an internal combustion engine is provided. The exhaust gas valve device comprises an electric drive, a driven drive rotatingly about an axis of rotation by the electric drive, an exhaust gas valve comprising a drive shaft aligned coaxially to the axis of rotation and which can be rotated about the axis of rotation for controlling the cross section and a coupling device for transmitting torque between the driven shaft and the drive shaft. The coupling device comprises a connection element connected to the drive shaft nonrotatably relative to the drive shaft, a transmission element connected to the driven shaft nonrotatably and axially adjustably relative to the driven shaft and connected to the connection element nonrotatably and axially adjustably relative to the connection element and a prestressing spring supported axially on the connection element or on the drive shaft or on the connection element and on the drive shaft and on the transmission element and axially driving the transmission element with the driven shaft.

According to another aspect of the invention, a muffler for an exhaust system of an internal combustion engine is provided. The muffler comprises an exhaust pipe and the electric exhaust gas valve device, wherein a valve diaphragm of the valve is arranged rotatably about the axis of rotation in the cross section of the exhaust pipe.

According to another aspect of the invention, an exhaust system for an internal combustion engine is provided, the exhaust system comprises: at least one exhaust pipe; and at least one of the electric exhaust gas valve devices, wherein a valve diaphragm of the valve is arranged rotatably about the axis of rotation in the cross section of the exhaust pipe.

The present invention is based on the general idea of equipping the coupling device with a connection element, with a transmission element and with a prestressing spring.

The connection element is connected nonrotatably relative to the drive shaft. The transmission element is connected in a nonrotatably and axially adjustable manner to the driven shaft, on the one hand, and connected in a nonrotatably and axially adjustable manner to the connection element, on the other hand. The prestressing spring is supported axially on the connection element and/or on the drive shaft as well as on the transmission element each and is configured such that it axially drives and prestresses the transmission element against the driven shaft.

Thermal elongation effects that lead to an expansion of the drive shaft in a direction toward the drive shaft can be compensated by means of the transmission arranged axially adjustably between the driven shaft and the drive shaft, without an undue high axial load of the drive shaft and of the electric drive occurring. Furthermore, it is achieved via the multiple components of the coupling device that heat can only be transferred via the contact points of the individual components of the coupling device within the coupling device, as a result of which the heat stream from the drive shaft through the coupling device to the driven shaft that is made possible by heat conduction is reduced.

Corresponding to an especially advantageous embodiment, the transmission element may have an especially cylindrical body, which is closed axially. The axially closed body is thus opaque in the axial direction, as a result of which the risk of heat radiation from the drive shaft through the body of the transmission element to the driven shaft is significantly reduced. In particular, no direct, linear, axial path of propagation for heat radiation of the drive shaft in the direction of the driven shaft is available through the axially closed body. As a result, the thermal load of the driven shaft and thus of the electric drive can be significantly reduced. Due to the axially closed and opaque configuration of the body, there is no continuously open connection within the body which openly discharges both on a front side of the body facing the driven shaft and on a rear side of the body facing the drive shaft.

In another advantageous embodiment, the transmission element may have an especially cylindrical body, which has on a front side facing the driven shaft a meshing contour that meshes with a counter-meshing contour formed on the driven shaft in a nonrotatably and axially adjustable manner. The meshing contour and the counter-meshing contour are accordingly shaped geometrically such that torques are transmitted between the driven shaft and the transmission element. The meshing contour is advantageously formed in the front side by at least one axial depression, with which the counter-meshing contour formed on the front-side end of the driven shaft meshes axially. Also particularly advantageous here is when this depression does not pass through the body of the transmission element in the axial direction, so that the body is closed axially at least in the area of the meshing contour.

In another advantageous embodiment, the transmission element may have an especially cylindrical body, which has on a rear side facing the drive shaft a preferably recessed spring mount, in which the prestressing spring is supported axially on the body. As a result, a defined positioning is created for the prestressing spring on the transmission element, for example, in order to bring about a centering between the drive shaft and the driven shaft concentric to the axis of rotation.

In another embodiment, the prestressing spring may be nonrotatably supported on the transmission element, on the one hand, and on the connection element and/or on the drive shaft, on the other hand, under torsional prestressing. In other words, the prestressing spring brings about a prestressing that is oriented in the circumferential direction between the transmission element, on the one hand, and the connection element and the drive shaft, on the other hand. Due to this feature, a play possibly present in the circumferential direction between the transmission element and the connection element can, in particular, be eliminated. Depending on the support of the prestressing spring, a possibly present play in the circumferential direction between the drive shaft and the connection element can thereby also be eliminated.

The nonrotatably and axially adjustable connection of the transmission element to the driven shaft, on the one hand, and to the connection element, on the other hand, may have a play in the circumferential direction, to guarantee the axial adjustability. To this extent, the term "nonrotatably" is defined such that minimal rotary adjustments, namely within the framework of this play that is possibly present in the circumferential direction, are also possible. A rigid connection does not come into consideration anyway because of the axial adjustability.

The prestressing spring may be designed, for example, as a coiled wire spring or as a coil spring. The corresponding spring wire here can be coiled in a helical and/or spiral manner. An embodiment, in which the prestressing spring is configured as a coil spring, is especially cost-favorable. The ends of the respective spring wire, which are bent away from the rest of the spring body for this purpose, can especially be used in a simple manner to achieve a nonrotatably support of the prestressing spring on the transmission element and on the connection element or on the drive shaft.

According to an advantageous variant, the transmission element may have on its rear side a torque-absorbing support contour, on which the prestressing spring is nonrotatably supported. This support contour may be formed in this connection, for example, by an axial depression, which is formed in an axially protruding conduit, enclosing the spring mount. For example, a correspondingly bent end section of a spring wire of the prestressing spring, which is configured, for example, as a helical or spiral coiled spring for this purpose, can be inserted into this depression. As a result, the transmission element obtains a comparatively high functional density.

In another embodiment, the transmission element may have a cylindrical body that has a peripheral, radially projecting collar closed in the circumferential direction. Due to this peripheral collar, a cross section of the body running at right angles to the axial direction is increased, as a result of which the blocking action of the transmission element for axially oriented heat radiation, which radiates from the drive shaft in the direction of the driven shaft, is also increased. To this extent, the peripheral collar improves the thermal protective effect for the electric drive.

In another embodiment, the transmission element may have at least two radially projecting carriers, each of which meshes in a nonrotatably and axially adjustable manner radially with a carrier opening formed on the connection element. An efficient, nonrotatably and axially adjustable connection, which is characterized by minimal contact points, is created between the transmission element and the connection element as a result, which reduces the direct transfer of heat between the connection element and the transmission element by heat conduction.

In an advantageous variant, said carriers may project radially from the above-mentioned collar. In addition or as an alternative, the collar may be located directly on the front side of the body. In each case, a simple geometry for the transmission element is created by these features.

In another variant, the connection element may have a U-shaped configuration and accordingly have two U legs as well as a U base connecting the U legs to one another. Each of these U legs has such a carrier opening, while the U base is nonrotatably connected to the drive shaft.

The nonrotatably connection between the connection element and the drive shaft can be established, for example, by means of a press fit between a shaft opening formed on the connection element and the drive shaft or by a nonround, especially polygonal, geometry at said shaft opening and at a then attached end section of the drive shaft.

In another advantageous embodiment, the transmission element may consist of a material, the heat conductivity of which is lower than the heat conductivity of the materials, of which the drive shaft, the prestressing spring and the connection element consist. This feature also leads to the heat conduction on the driven shaft and thus to the electric drive being reduced through the coupling device.

In addition or as an alternative, the transmission element may consist of a material, the heat conductivity of which at 0° C. is lower than 10 W/mK, W denoting watts, m denoting meters and K denoting Kelvin. The material, of which the transmission element consists, may preferably have a heat conductivity of maximum 5 W/mK. By comparison, unalloyed steel has a heat conductivity of about 50 W/mK, while aluminum has a heat conductivity of above 200 W/mK and copper has a heat conductivity of above 300 W/mK. Accordingly, the transmission element acts as a thermal insulator. In particular, the transmission element may consist of a ceramic, for example, zirconium oxide. As an alternative, the transmission element may also be a plastic body, e.g., made of PEEK (polyether ether ketone).

The transmission element, the connection element and the prestressing spring form components that are separate in relation to one another. Furthermore, each of these components is, taken by itself, a single piece or is manufactured from one piece. These components are thus not assembled from a plurality of individual parts. In particular, the transmission element is formed by a single cast part or sintered part. The connection element is manufactured, for example, from a single sheet metal body by means of forming. The prestressing spring is especially manufactured from a single spring wire by forming.

An embodiment, in which the coupling device is formed exclusively by the transmission element, the connection element and the prestressing spring, is now especially advantageous. Accordingly, the coupling device has only three components. As a result, the coupling device and thus the electric exhaust gas valve device can be manufactured at a comparatively low cost.

A muffler according to the present invention, which is provided for an exhaust system of an internal combustion engine, comprises an exhaust pipe as well as an electric exhaust gas valve device of the type described above, the exhaust gas valve device being attached to the exhaust pipe for controlling the cross section, through which flow is possible, of the exhaust pipe such that the exhaust gas valve is arranged rotatably about the axis of rotation in the cross section of the exhaust pipe.

An exhaust system according to the present invention, which is provided for an internal combustion engine, especially of a motor vehicle, comprises at least one exhaust pipe and at least one electric exhaust gas valve device of the type described above, the respective exhaust gas valve device being attached to the exhaust pipe for controlling the cross section, through which flow is possible, of the respective exhaust pipe such that the exhaust gas valve is arranged rotatably about the axis of rotation in the cross section of the exhaust pipe.

The axis of rotation may then advantageously extend at right angles to a central longitudinal axis of the exhaust pipe. In an exhaust gas valve configured as a butterfly valve, the drive shaft extends more or less centrally through the valve diaphragm, which is preferably symmetrical with regard to the drive shaft. Further, the axis of rotation extends more or less centrally through the exhaust pipe.

According to an advantageous variant of the muffler and of the exhaust system, the drive shaft may be mounted rotatably axially on both sides of the exhaust gas valve in a mount on each side, which is fastened to the exhaust pipe. As a result, a high functional safety and reliability is achieved for the exhaust gas valve device.

In the present context, the direction terms "axial," "radial" and "circumferential direction" refer to the axis of rotation of the driven shaft of the electric drive. This axis of rotation defines the axial direction, which extends parallel to the axis of rotation. The radial direction and the circumferential direction are then also defined by the axial direction.

It is apparent that the above-mentioned features, which will also be explained below, are applicable not only in the particular combination indicated but also in other combinations or alone without going beyond the scope of the present invention.

Preferred exemplary embodiments of the present invention are shown in the drawings and will be explained in more detail in the following description, in which identical reference numbers pertain to identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
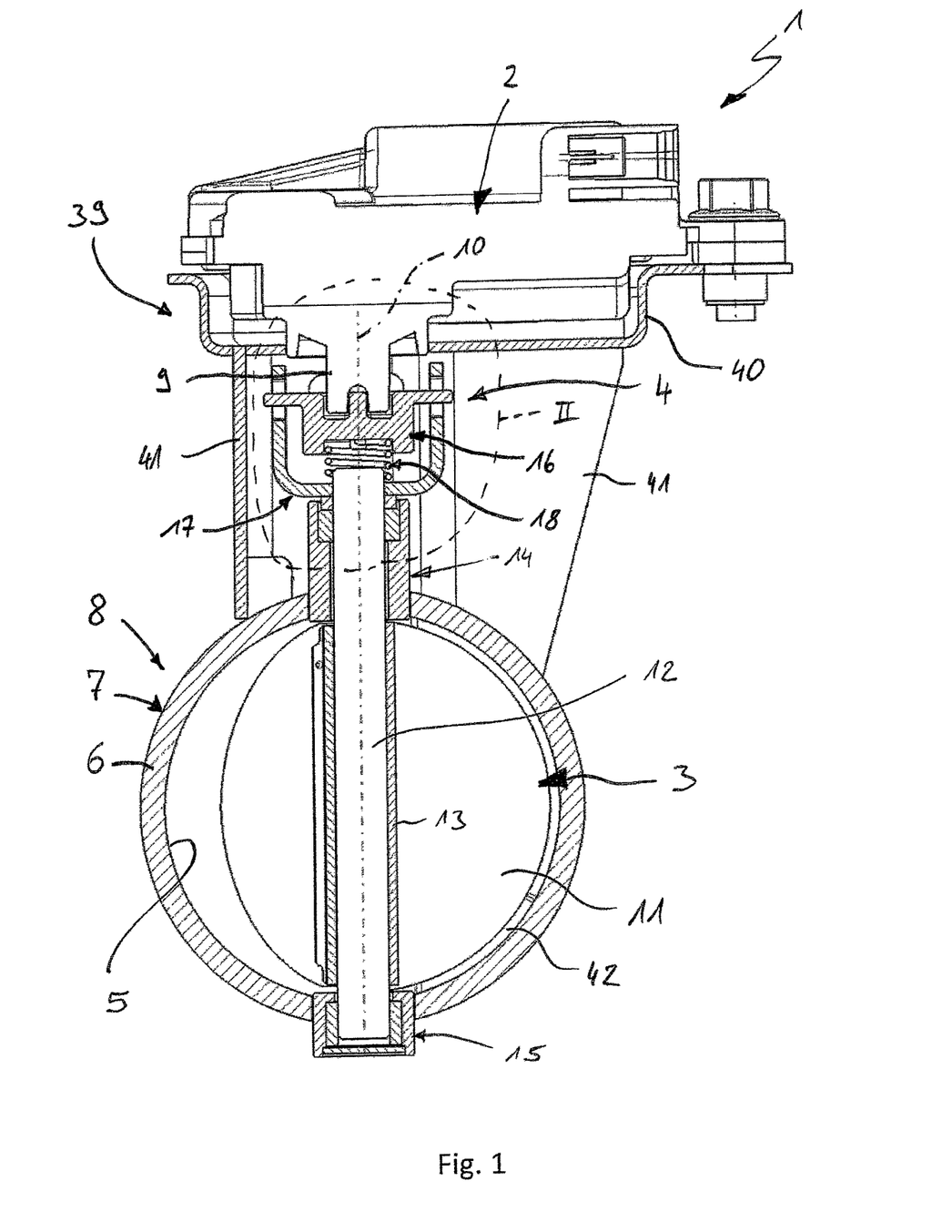
FIG. 1 is a partially cut view of an electric exhaust gas valve device in a muffler and in an exhaust system.

Referring to the drawings, corresponding to FIG. 1, an electric exhaust gas valve device 1 comprises an electric drive 2, an exhaust gas valve 3 and a coupling device 4 in order to couple the electric drive 2 drivingly with the exhaust gas valve. The exhaust gas valve device 1 is used for controlling a cross section 5, through which flow is possible, of an exhaust pipe 6, which many be a component of a muffler 7 and/or a component of an exhaust system 8. The exhaust system 8 is usually used for discharging exhaust gas from an internal combustion engine, which may be arranged especially in a motor vehicle.

The electric drive 2 has a driven shaft 9, which can be driven rotatingly about an axis of rotation 10 by the electric drive 2. The exhaust gas valve 3 has a valve diaphragm 11 for controlling the cross section 5 to be controlled as well as a drive shaft 12. The drive shaft 12 is aligned coaxially to the axis of rotation 10 such that the central longitudinal axis thereof coincides with the axis of rotation 10. The exhaust gas valve 3 can be rotated about the axis of rotation 10 for controlling the cross section 5 to be controlled. For this purpose, the drive shaft 12 is rotated about the axis of rotation 10. In this case, the valve diaphragm mounted nonrotatably on the drive shaft 12 is also rotated. In FIG. 1, the valve diaphragm 11 is shown on the right side of the drive shaft 12 in a closed position, while it is shown in a half-open opened position on the left side of the drive shaft 12. However, the valve diaphragm 11 is preferably configured such that it lies in a plane, in which the axis of rotation 10 also lies. In the example, the valve diaphragm 11 is attached to the drive shaft 12, for which the valve diaphragm 11 has a sleeve-like central area 13 rigidly connected thereto, which is axially pushed onto the drive shaft 12 and is rigidly connected thereto in a suitable manner. The central area 13 may be formed integrally in one piece on the valve diaphragm 11, the valve diaphragm 11 and the central area 13 being especially formed by a single shaped sheet metal part. Further, the exhaust gas valve 3 in the example is configured as a butterfly valve, in which the drive shaft 12 extends in the middle or centrally through the valve diaphragm 11. In principle, however, other designs are also conceivable for such exhaust gas valves 3, e.g., with an eccentric drive shaft 12, especially arranged at the edge, arranged on the valve diaphragm 11.

The exhaust pipe 6 encloses the cross section 5 that is controllable by means of the valve diaphragm 11. With regard to the valve diaphragm 11, the exhaust pipe also forms a housing, in which the valve diaphragm 11 is arranged and on which the exhaust gas valve 3 is rotatably arranged.

The exhaust gas valve device 1 presented here thus essentially comprises the electric drive 2 with the driven shaft 9 and a valve assembly unit 39 that has the exhaust gas valve 3 and the coupling device 4. In the example of FIG. 1, the valve assembly unit 39 comprises, in addition, a drive bracket 40, which is rigidly connected to the exhaust pipe 6 via a support structure 41, for mounting the electric drive 2. The electric drive 2 and the valve assembly unit 9 form units which can be manufactured and preassembled separately as a result.

In the example of FIG. 1, two mounts 14, 15, in which the drive shaft 12 is mounted on both sides of the valve diaphragm 11, are provided for the rotatable mounting of the exhaust gas valve 3. In this case, the two mounts 14, 15 are fastened to the exhaust pipe 6, and the one mount 14 is arranged on a side of the exhaust pipe 6 facing the electric drive 2 and thus is arranged proximally to the electric drive 2, while the other mount 15 is mounted on a side of the exhaust pipe 6 facing away from the electric drive 2 and thus distally to the electric drive 2. Therefore, the two mounts 14, 15 may also be designated below as proximal mount 14 and distal mount 15, respectively. The proximal mount 14 has an axially greater overall length than the distal mount 15, as a result of which the transfer of heat from the exhaust pipe 6 via the proximal mount 14 in the direction of the electric drive 2 is reduced.

An end stop 42, with which the valve diaphragm 11 comes into contact in its closed position, can, in addition, be seen in the sectional view of FIG. 1.

Figure 2:
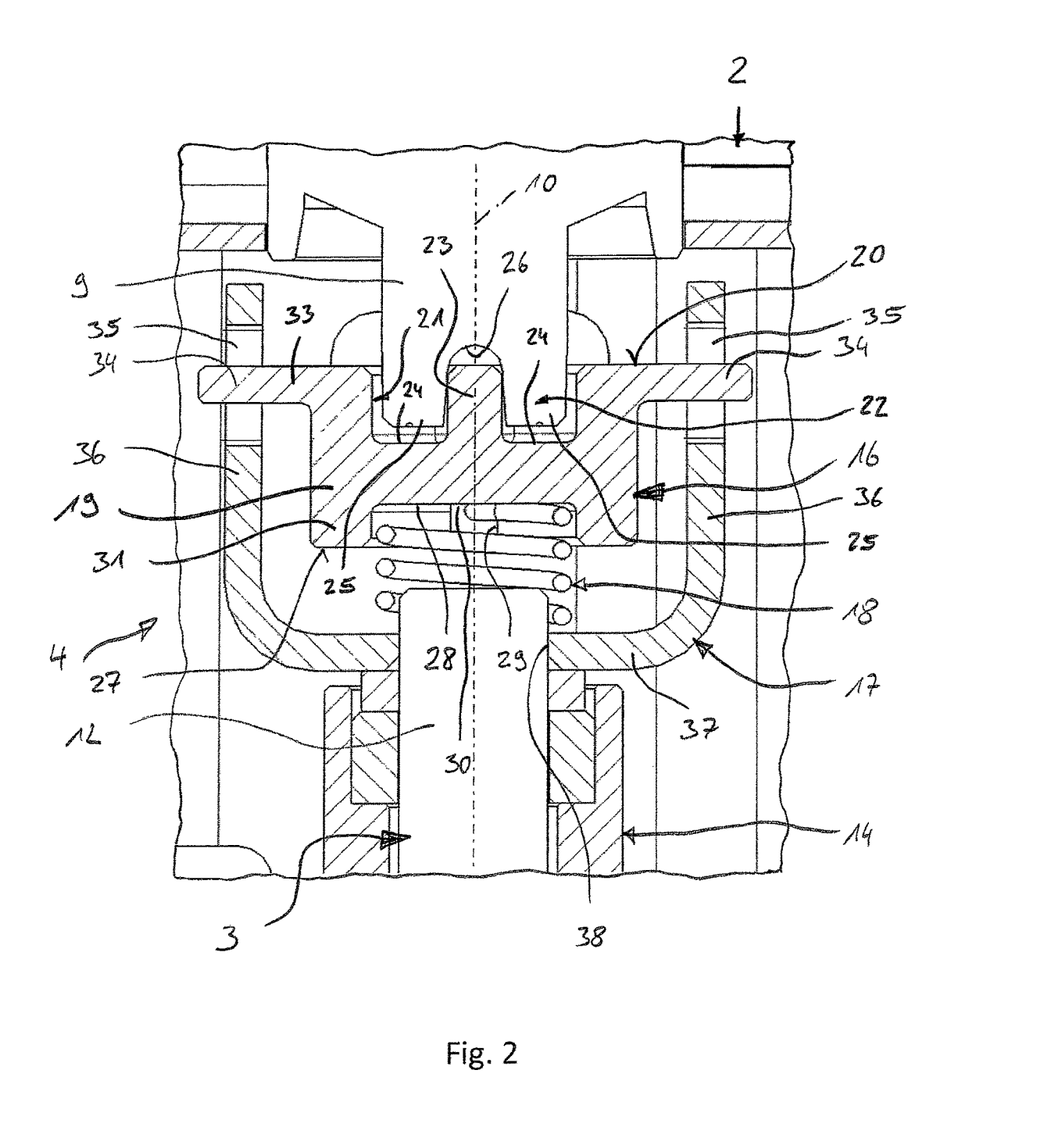
FIG. 2 is an enlarged view of a detail II in FIG. 1.
Figure 3:
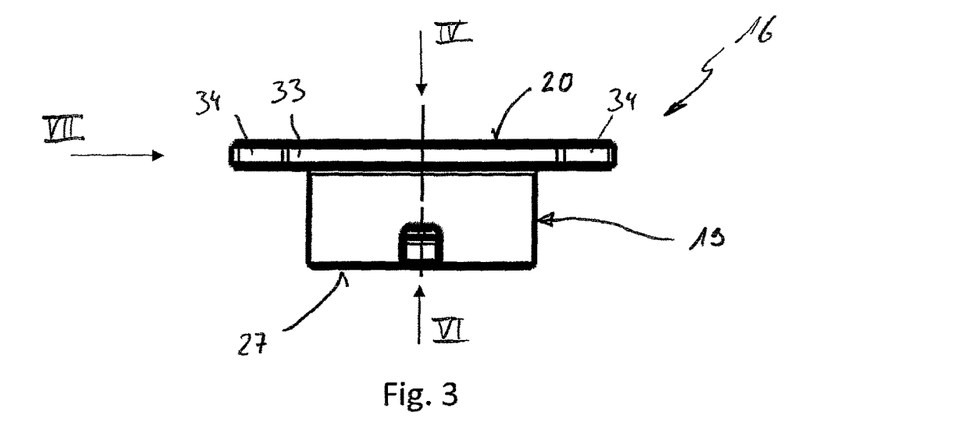
FIG. 3 is a side view of a transmission element corresponding to a direction of view III in FIGS. 4 and 6.

The coupling device 4 is used for transmitting torques between the driven shaft 9 and the drive shaft 12 according to FIGS. 1 and 2. For this purpose, the coupling device 4 is connected nonrotatably relative to the driven shaft 9, on the one hand, and to the drive shaft 12, on the other hand. The coupling device 4 comprises, in particular, a transmission element 16, a connection element 17 as well as a prestressing spring 18. The connection element 17 is nonrotatably connected to the drive shaft 12. The transmission element 16 is connected in a nonrotatably and axially adjustable manner to the driven shaft 9, on the one hand, and in a nonrotatably and axially adjustable manner to the connection element 17, on the other hand. The prestressing spring 18 is axially supported on the transmission element 16, on the one hand, and on the connection element 17 and/or on the drive shaft 12 each. Further, the prestressing spring is configured as a compression spring such that it prestresses, i.e., drives, the transmission element 16 against the driven shaft 9. This axially prestressed mounting of the prestressing spring 18 eliminates all axial play in the drive connection between the drive shaft 12 and the driven shaft 9, on the one hand. On the other hand, the prestressing spring 18 can in this way compensate thermally related axial elongation effects, which change the relative position between the drive shaft 12 and the driven shaft 9.

Corresponding to FIGS. 2 through 7, the transmission element 16 has a body 19, which preferably has a cylindrical configuration. The body 19 is closed axially. The body 19 thus has in its interior no axially continuous opening. To this extent, the body is impermeable in the axial direction especially to axially oriented heat radiation, which is emitted from the drive shaft 12 during the operation of the exhaust system 8.

Figure 4:
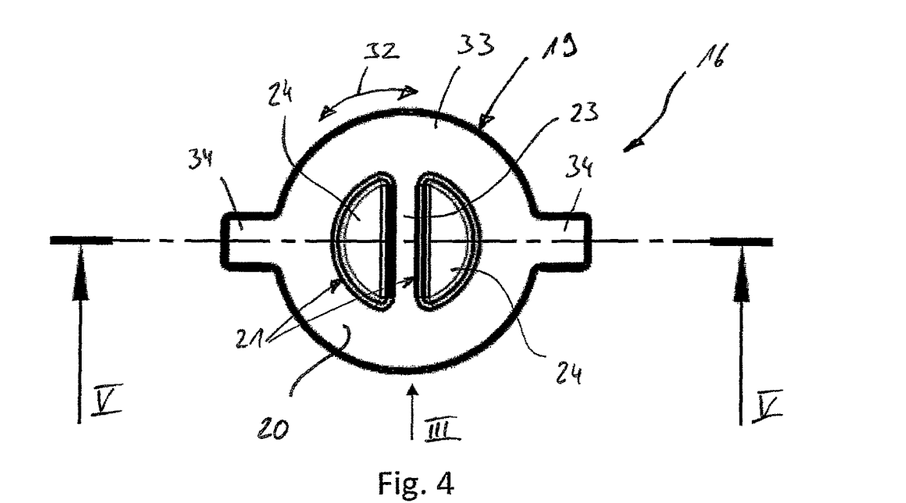
FIG. 4 is a view from above of the transmission element corresponding to a direction of view IV in FIG. 3.
Figure 5:
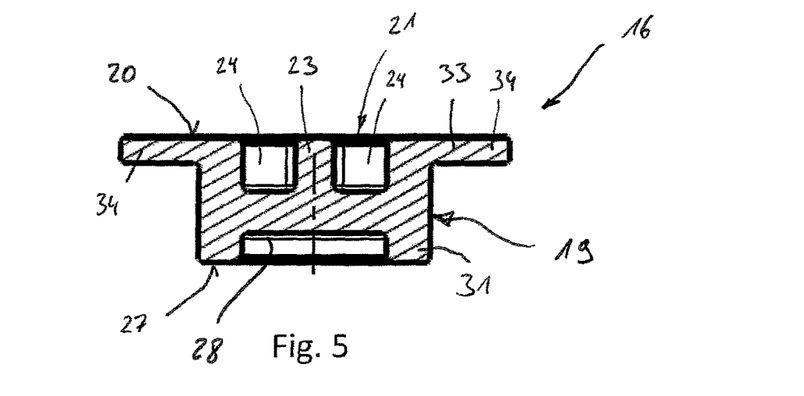
FIG. 5 is a longitudinal section of the transmission element corresponding to sectional lines V in FIG. 4.

The body 19 of the transmission element 16 has a front side 20 facing the driven shaft 9, in which front side a meshing contour 21 is formed. A counter-meshing contour 22 shaped complementary thereto, which is formed on an end section of the driven shaft 9, meshes with this meshing contour 21. The counter-meshing contour 22 meshes axially with the meshing contour 21 and meshes with it in a nonrotatably and axially adjustable manner. In the example shown, the meshing contour 21 according to FIG. 4 is formed by a circular, recessed area, which is split in the middle by a continuous web 23 into two separate, more or less semicircular depressions 24. According to FIG. 2, the counter-meshing contour 22 has two extensions 25 complementary thereto, each of which meshes axially with one of these depressions 24 and each of which is spaced apart from one another centrally by a gap 26, with which the web 23 meshes axially.

The body 19 of the transmission element 16 has, in addition, a rear side 27 facing the drive shaft 12, in which a spring mount 28 is formed, and likewise in the form of an axial depression, into which the prestressing spring 18 dips axially and in which the prestressing spring 18 is supported axially on the body 19.

Figure 6:
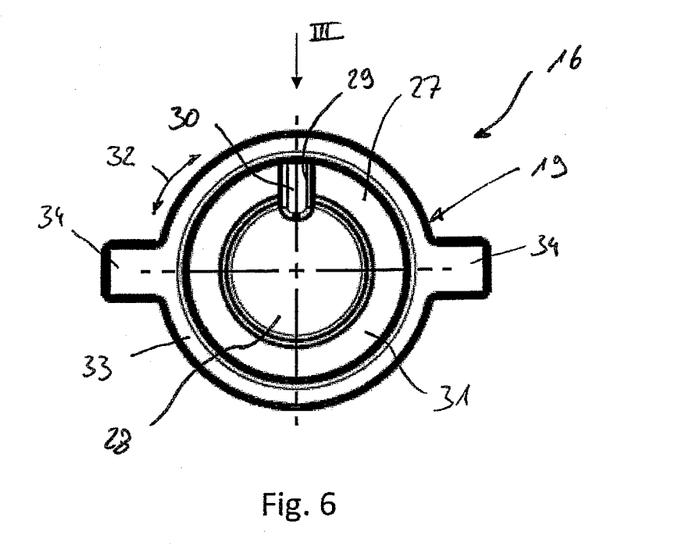
FIG. 6 is a view from below of the transmission element corresponding to a direction of view VI in FIG. 3.
Figure 7:
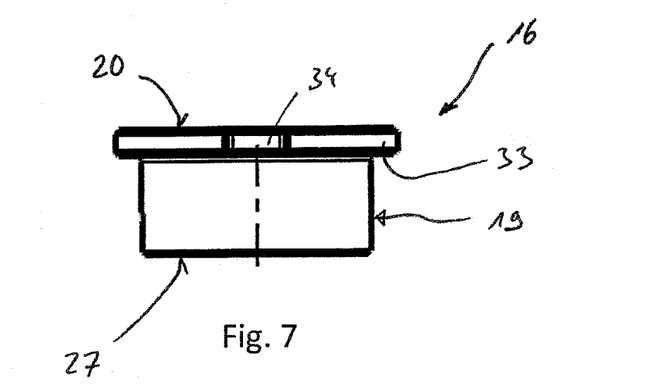
FIG. 7 is a side view of the transmission element in a direction of view VII in FIG. 3.

Preferred is an embodiment, in which the prestressing spring 18 is nonrotatably supported, on the one hand, on the transmission element 16 and, on the other hand, on the connection element 17 and/or on the drive shaft 12 and, in addition, is prestressed in a circumferential direction 32 indicated in FIGS. 4 and 6 by a double arrow. Thus, moreover, the prestressing spring 18 is advantageously additionally mounted with a torsional prestressing for axial prestressing. All play in the circumferential direction that may be present within the coupling device 4 can be eliminated by the torsional prestressing. The prestressing spring 18 is configured in the example as a coil spring, which is rotated about the axis of rotation 10 for a torsional prestressing.

The transmission element 16 has for the prestressing spring 18 a support contour 29, which is able to absorb torque and thus makes possible the nonrotatably support of the prestressing spring 18 on the transmission element 16. In the example, this support contour 29 is formed by an axial depression 30, which is formed in a conduit 31, which encloses the spring mount 28 in the circumferential direction 32 and which protrudes axially from the rest of the body 19.

In the preferred exemplary embodiment shown here, the transmission element 16 is equipped on its body 19, in addition, with a collar 33, which projects radially from the cylindrical body 19 and circulates closed in the circumferential direction 32. In the example shown, the collar 33 is formed on the front side 20. The collar 33 increases the cross section of the transmission element 16 and consequently prevents a radiation of heat from the drive shaft 12 to the driven shaft 9.

In the example, the transmission element 16 has, in addition, precisely two radially projecting carriers 34, which are arranged diametrically opposite one another and each of which meshes radially with a carrier opening 35 and even extends through this carrier opening. These carrier openings 35 are formed on the connection element 17 and are formed by axially oriented elongated holes in the example. The carriers 34 mesh with the carrier openings 35 in a nonrotatably and axially adjustable manner, as a result of which the desired nonrotatably and axially adjustable connection between the transmission element 16 and the connection element 17 is formed. In the example of the embodiment shown here, the carriers 34 are formed on said collar 33 such that they project radially outward from the collar 33.

According to FIG. 2, the connection element 17 has a U-shaped configuration in the sectional plane shown in FIG. 2 such that it has two U legs 36 and a U base 37, which connects the two U legs 36 to one another. The two U legs 36 have each such a carrier opening 35. The U base 37 is connected nonrotatably relative to the drive shaft 12. For this purpose, the U base 37 or the connection element 17 has a shaft opening 38, through which an end section of the drive shaft 12 is inserted. The nonrotatably connection in the area of this shaft opening 38 can be established by a press fit or by positive locking in connection with a nonround or angular or polygonal cross section of the drive shaft 12 and the connection element 17 in the area of the shaft opening 38.

The transmission element 16 preferably consists of a ceramic, for example, zirconium oxide. Also conceivable is the use of a transmission element made of PEEK. The transmission element 16 preferably consists of a material, the heat conductivity of which is lower than the heat conductivity of the material, of which the drive shaft 12, the connection element 17 and the prestressing spring 18 are made. In particular, the transmission element 16 has a heat conductivity, which at 0° C. is lower than 10 W/mK and is preferably lower than 5 W/mK.

According to FIGS. 1 and 2, the coupling device 4 comprises precisely three separate components, specifically the transmission element 16, the connection element 17 and the prestressing spring 18. As a result, the coupling device 4 can be manufactured at a comparatively low cost.

While specific embodiments of the invention have been shown and described in detail to illustrate the application of the principles of the invention, it will be understood that the invention may be embodied otherwise without departing from such principles.

What is claimed is:

1. An electric exhaust gas valve device for controlling a cross section, which receives flow of exhaust gas, of an exhaust pipe of an exhaust system of an internal combustion engine, the exhaust gas valve device comprising:
    an electric drive which has a driven shaft that is driven rotatingly about an axis of rotation by the electric drive;
    an exhaust gas valve comprising a drive shaft aligned coaxially to the axis of rotation and which is rotatable about the axis of rotation for controlling the cross section; and
    a coupling device for transmitting torque between the driven shaft and the drive shaft, the coupling device comprising:
    a connection element connected to the drive shaft nonrotatably relative to the drive shaft;
    a transmission element connected to the driven shaft nonrotatably and axially adjustably relative to the driven shaft, the transmission element is connected to the connection element nonrotatably and axially adjustably relative to the connection element, the transmission element being formed as a single piece; and
    a prestressing spring supported axially on the connection element or on the drive shaft or on the connection element and on the drive shaft and on the transmission element and axially driving the transmission element with the driven shaft.

2. The exhaust gas valve device in accordance with claim 1, wherein the transmission element comprises a body that is closed axially.

3. The exhaust gas valve device in accordance with claim 1, wherein the transmission element comprises a body with a spring mount in which the prestressing spring is axially supported on the body on a rear side of the body facing the drive shaft.

4. The exhaust gas valve device in accordance with claim 1, wherein the prestressing spring is supported under torsional prestressing nonrotatably on the transmission element and is supported under torsional prestressing nonrotatably on the connection element or is supported under torsional prestressing nonrotatably on the drive shaft or is supported under torsional prestressing nonrotatably on the transmission element and is supported under torsional prestressing nonrotatably on the connection element and is supported under torsional prestressing nonrotatably on the drive shaft.

5. The exhaust gas valve device in accordance with claim 3, wherein:
    the transmission element has a rear side with a torque-absorbing support contour on which the prestressing spring is supported nonrotatably relative thereto; and
    the support contour is formed by an axial depression in an axially protruding conduit enclosing the spring mount.

6. The exhaust gas valve device in accordance with claim 1, wherein the transmission element comprises a cylindrical body with a peripheral, radially projecting collar, which collar is closed in a circumferential direction.

7. The exhaust gas valve device in accordance with claim 6, wherein the transmission element comprises at least two radially projecting carriers, each of which carriers meshes radially in a nonrotatably and axially adjustable manner with a carrier opening formed on the connection element.

8. The exhaust gas valve device in accordance with claim 7, wherein the carriers project radially from the collar.

9. The exhaust gas valve device in accordance with claim 7, wherein:
the connection element has a U-shaped configuration with two legs and a base connecting the legs to one another;
each leg has such a carrier opening; and
the base is connected nonrotatably relative to the drive shaft.

10. The exhaust gas valve device in accordance with claim 1, wherein the transmission element is formed of a material with a heat conductivity that is lower than a heat conductivity of material of the drive shaft and lower than a heat conductivity of material of the prestressing spring and lower than a heat conductivity of material of the connection element.

11. The exhaust gas valve device in accordance with claim 1, wherein the transmission element is comprised of a material with a heat conductivity which is lower than 10 W/mK.

12. The exhaust gas valve device in accordance with claim 1, wherein the transmission element is comprised of a ceramic or a plastic.

13. The exhaust gas valve device in accordance with claim 1, wherein the coupling device is formed by the transmission element, the connection element and the prestressing spring.

14. A muffler for an exhaust system of an internal combustion engine, the muffler comprising:
an exhaust pipe; and
an electric exhaust gas valve device attached to the exhaust pipe for controlling a cross section which receives flow of exhaust gas, the electric exhaust gas valve device comprising:
an electric drive which has a driven shaft that is driven rotatingly about an axis of rotation by the electric drive;
an exhaust gas valve comprising a drive shaft aligned coaxially to the axis of rotation and which is rotatable about the axis of rotation for controlling the cross section and a valve diaphragm arranged rotatably about the axis of rotation in the cross section of the exhaust pipe; and
a coupling device for transmitting torque between the driven shaft and the drive shaft, the coupling device comprising:
a connection element connected to the drive shaft nonrotatably relative to the drive shaft;
a transmission element connected to the driven shaft nonrotatably and axially adjustably relative to the driven shaft, the transmission element is connected to the connection element nonrotatably and axially adjustably relative to the connection element, the transmission element being formed as a single piece; and
a prestressing spring supported axially on the connection element or on the drive shaft or on the connection element and on the drive shaft and on the transmission element and axially driving the transmission element with the driven shaft.

15. The muffler in accordance with claim 14, wherein the drive shaft is mounted rotatably axially in a mount on both sides of the valve diaphragm, each mount being fastened to the exhaust pipe.

16. The muffler in accordance with claim 15, wherein:
the transmission element comprises a body with a meshing contour nonrotatably and axially adjustably meshing with a counter-meshing contour formed on the driven shaft, on a front side facing the driven shaft; and
the transmission element comprises a body with a spring mount in which the prestressing spring is axially supported on the body on a rear side of the body facing the drive shaft.

17. The muffler in accordance with claim 16, wherein:
the transmission element has a rear side with a torque-absorbing support contour on which the prestressing spring is supported nonrotatably relative thereto; and
the support contour is formed by an axial depression in an axially protruding conduit enclosing the spring mount.

18. An exhaust system for an internal combustion engine, the exhaust system comprising:
at least one exhaust pipe; and
at least one electric exhaust gas valve device attached to the exhaust pipe for controlling the cross section, which receives flow of exhaust gas, the electric exhaust gas valve device comprising:
an electric drive which has a driven shaft that is driven rotatingly about an axis of rotation by the electric drive;
an exhaust gas valve comprising a drive shaft aligned coaxially to the axis of rotation and which is rotatable about the axis of rotation for controlling the cross section and a valve diaphragm arranged rotatably about the axis of rotation in the cross section of the exhaust pipe; and
a coupling device for transmitting torque between the driven shaft and the drive shaft, the coupling device comprising:
a connection element connected to the drive shaft nonrotatably relative to the drive shaft;
a transmission element connected to the driven shaft nonrotatably and axially adjustably relative to the driven shaft, the transmission element is connected to the connection element nonrotatably and axially adjustably relative to the connection element, the transmission element being formed as a single piece; and
a prestressing spring supported axially on the connection element or on the drive shaft or on the connection element and on the drive shaft and on the transmission element and axially driving the transmission element with the driven shaft.

19. The exhaust system in accordance with claim 18, wherein the drive shaft is mounted rotatably axially in a mount on both sides of the valve diaphragm, each mount being fastened to the exhaust pipe.

20. An electric exhaust gas valve device for controlling a cross section, which receives flow of exhaust gas, of an exhaust pipe of an exhaust system of an internal combustion engine, the exhaust gas valve device comprising:
an electric drive which has a driven shaft that is driven rotatingly about an axis of rotation by the electric drive;
an exhaust gas valve comprising a drive shaft aligned coaxially to the axis of rotation and which is rotatable about the axis of rotation for controlling the cross section; and
a coupling device for transmitting torque between the driven shaft and the drive shaft, the coupling device comprising:
a connection element connected to the drive shaft nonrotatably relative to the drive shaft;
a transmission element connected to the driven shaft nonrotatably and axially adjustably relative to the driven shaft, the transmission element is connected to the connection element nonrotatably and axially adjustably relative to the connection element, the transmission element being formed as a single piece; and a prestressing spring supported axially on the connection element or on the drive shaft or on the connection element and on the drive shaft and on the transmission element and axially driving the transmission element with the driven shaft;

the transmission element comprising a body with a meshing contour nonrotatably and axially adjustably meshing with a counter-meshing contour formed on the driven shaft, on a front side facing the driven shaft.

* * * * *